(12) United States Patent
Renner et al.

(10) Patent No.: US 6,366,327 B1
(45) Date of Patent: Apr. 2, 2002

(54) VERTICAL SYNC DETECTION AND OUTPUT FOR VIDEO DECODER

(75) Inventors: Karl H. Renner, Dallas; Weider Peter Chang, Hurst, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/126,629

(22) Filed: Jul. 30, 1998

Related U.S. Application Data

(60) Provisional application No. 60/068,465, filed on Dec. 22, 1997.

(51) Int. Cl.[7] ............................. H04N 5/14; H04N 5/46; H04N 7/00
(52) U.S. Cl. ....................... 348/558; 348/555; 348/554; 348/604; 348/542; 348/547; 348/545
(58) Field of Search .................................. 348/558, 555, 348/542, 543, 544, 545, 554, 556, 547, 548, 604; H04N 5/46, 5/14; H03L 7/00

(56) References Cited

U.S. PATENT DOCUMENTS

| | | | | |
|---|---|---|---|---|
| 4,309,719 A | * | 1/1982 | Hinn | 358/21 |
| 4,349,839 A | * | 9/1982 | McGinn | 358/148 |
| 4,414,563 A | * | 11/1983 | Juhnke et al. | 358/21 |
| 4,688,082 A | * | 8/1987 | Kato | 358/21 |
| 4,754,487 A | * | 6/1988 | Newmuis | 382/2 |
| 4,821,112 A | * | 4/1989 | Sakamoto et al. | 358/17 |
| 4,897,723 A | * | 1/1990 | Arai | 358/158 |
| 4,985,757 A | * | 1/1991 | Yasuki et al. | 358/31 |
| 5,111,160 A | * | 5/1992 | Hershberger | 331/1 |
| 5,307,165 A | * | 4/1994 | Kawashima et al. | 348/441 |
| 5,374,962 A | * | 12/1994 | Klink | 348/557 |
| 5,400,078 A | * | 3/1995 | Maldonado | 348/558 |
| 5,543,854 A | * | 8/1996 | Morikawa et al. | 348/512 |
| 5,673,088 A | * | 9/1997 | Nah | 348/555 |
| 5,694,175 A | * | 12/1997 | Gaigneux et al. | 348/558 |
| 5,781,185 A | * | 7/1998 | Shin | 345/213 |
| 5,784,117 A | * | 7/1998 | Mitarai et al. | 348/558 |
| 5,905,538 A | * | 5/1999 | Shuholm et al. | 348/555 |
| 5,943,101 A | * | 8/1999 | Hirtz et al. | 348/604 |

* cited by examiner

*Primary Examiner*—Michael Lee
*Assistant Examiner*—Paulos Natnael
(74) *Attorney, Agent, or Firm*—Alan K. Stewart; Wade James Brady, III; Frederick J. Telecky, Jr.

(57) ABSTRACT

A technique for detecting three modes of video input signal and outputting a vertical sync signal based on the input signal. In a first mode, a standard video signal is received and a line counter is used to decode and output the vertical sync. In a second mode where a non-standard signal is received, line counter cannot be used, but a vertical sync is detected and output. In a third mode, no video input signal is received, yet a vertical sync is output in free-running mode so that a blank screen is displayed.

33 Claims, 11 Drawing Sheets

VERTICAL SYNC DETECTION AND OUTPUT FOR VIDEO DECODER

CROSS-REFERENCE TO RELATED APPLICATION

This application claims priority from provisional Ser. No. 60/068,465, filed Dec. 22, 1997, which is hereby incorporated by reference. However, the content of the present application is not identical to that of the priority application.

BACKGROUND AND SUMMARY OF THE INVENTION

The present invention relates to synchronization signal detection in video decoders.

Background: Composite Video

The satisfactory reproduction of a picture requires the transmission of several types of information combined into a single waveform called a composite video signal. The signal is composed of video information and synchronizing information. Composite video describes a signal in which luminance, chrominance, and synchronization information are multiplexed in the frequency, time, and amplitude domain for a single-wire distribution. Luminance is defined as the component signal in color video systems that represents the brightness of the image. Chrominance is defined as the component signal in color video systems that describe color-difference information (and can largely be ignored for the purposes of this application).

The video signal conveys information concerning the blanking level, the black reference level, average scene brightness level, picture details, and color values. The baseband video signal is unipolar with one direct current ("DC") level (nominally 0 volts) representing black, and a second level (nominally +700 mV) representing white. Any level between 0 and 700 mV represents a degree of gray.

The synchronizing information consists of horizontal and vertical scanning synchronization, and chrominance decoder synchronization. The horizontal and vertical synchronization information is used to trigger the horizontal and vertical deflection circuits in the receiver. The horizontal sync tells the display where to put the video signal in the left-right dimension, and the vertical sync tells the display where to put the signal in the top-bottom dimension. Synchronization consists of pulses having a specific amplitude, duration, and shape best suited to the task at hand. The synchronizing pulses are unipolar with a reference level of 0 V and a peak negative level of nominally −300 mV.

The video signal waveform, with a nominal peak-to-peak amplitude of 700 mV, and the synchronizing signal waveform with a nominal peak-to-peak amplitude of 300 mV, are added together to form a composite video signal of 1 V peak-to-peak. The synchronizing pulses are placed in parts of the composite signal that do not contain active picture information. These parts are blanked (forced below a black level) to render invisible the retrace of scanning beams on a correctly adjusted display.

The standard video signal levels apply to both conventional television scanning standards—National Television System Committee ("NTSC") and Phase Alternating Line ("PAL"). The U.S standard is NTSC which uses 525 lines at 60 Hz, while PAL is predominant in Europe and uses 625 lines at 50 Hz. Composite video signals are expressed in IRE units. An IRE unit is defined as one-hundredth of the excursion from the blanking level (0 IRE units) to the reference white level (100 IRE units). A standard 1 V peak-to-peak signal is said to have an amplitude of 140 IRE units of which 100 IRE units are luminance, and 40 IRE units are synchronization information. Further discussion of video circuits and signals can be found in the following texts: M. Robin, DIGITAL TELEVISION FUNDAMENTALS, McGraw-Hill (1998); K. Jack, VIDEO DEMYSTIFIED, 2nd Edition, Harris Semiconductor (1996); and A. Inglis, VIDEO ENGINEERING, 2nd Edition, McGraw-Hill (1996), all of which are hereby incorporated by reference.

Background: Interlaced Scanning Systems

A frame of video is essentially one picture or "still" out of a video stream of pictures. In NTSC, a frame comprises 525 individual scan lines (for PAL 625 lines). For NTSC, after 525 lines have been displayed on the screen, the picture presentation process continues with the next frame of 525 lines. An interlaced TV screen (and only an interlaced scanning system) is made using two fields, each one containing half of the scan lines needed to make one frame. Although in analog terminology, each field is considered to have 262.5 lines, in the digital domain, it is convenient to consider each field comprising a whole number of lines; 263 for the odd field, and 262 for the even field. For NTSC, the lines number 1–263 for the odd field, and 264–525 for the even field. The composite video signal contains a vertical sync pulse which signals the start of the odd and even fields. The first 9 lines of both the odd and even fields are vertical sync pulses. Each field is displayed in its entirety—therefore, the odd field is displayed, then the even field, then the odd field, and so on. The vertical scan frequency is chosen so that half of the scanning lines are contained in each field. This causes the first line of alternate fields to begin in the center of the picture, and the lines are interleaved between fields. Each field occurs at a rate of 60 Hz for NTSC (50 Hz for PAL) television standards.

Background: Problems with Non-Standard Signals

Non-standard video sources present problems to logic that is designed for standard video inputs. In a non-standard video mode, video signals obtained from sources such as the VCR in rewind, fast forward, pause modes, and video games, may output frames which do not have the standard number of lines (e.g. 528 lines in a 525-line NTSC standard). A non-standard signal exhibits a lack of serration pulses which normally indicate the start of the sync pulse. (Vertical sync is identified by broad pulses, which are "serrated" in order for a receiver to maintain horizontal sync, even during the vertical interval.) The signal may instead provide one large broad pulse where the serration pulses are normally expected in a standard video signal. The absence of sync level between the end of a broad pulse, and the start of the following sync pulse is called serration. Thus decode from the line counter is not possible. The inability to detect a non-standard signal may result in vertical roll of the picture presented to the viewer. This non-standard mode must be detected and a vertical sync output when a sync is detected at the input.

Another problem arises when there is no video input present. Here it is still desirable to output a vertical sync in a free running mode so that a blank screen is displayed on the monitor. Automatic detection of these three modes is a desired feature.

Vertical Sync Detection and Output for Video Decoder

The present application discloses a technique for automatic detection of three modes of input video signals.

Furthermore, upon detection of a particular mode, the circuit automatically adapts to the input signal, and outputs a vertical sync pulse based on the input sync signal, or lack thereof. In a first mode, a standard video signal is received and a line counter is used to decode and output the vertical sync. In a second mode where a non-standard signal is received, the line counter cannot be used, but a correct vertical sync is generated by a special procedure. In a third mode, no video input signal is received, yet a vertical sync is output in free-running mode so that a blank screen is displayed. The video decoder must recognize the three modes of video input, detect the vertical sync pulse, and then output a vertical sync pulse for each of the two fields. For a standard video mode, a vertical line counter (clocked and incremented by the horizontal sync pulse at the input) controls the modulus of the line counter, and is used to decode and output a vertical sync pulse. Odd and even vertical sync pulses may be determined by the relationship between the detected vertical sync and the horizontal sync at the input. It counts from 1 to a terminal count based on the video standard employed (525 for NTSC and 625 for PAL). A value of 1 indicates the start of vertical sync for an odd field and a value of terminal count divided by 2 indicates the start for an even field. The particular video standard (NTSC or PAL) is used to set the counter modulus.

An advantage of the disclosed method is automatic detection of and adaptation to NTSC and PAL standards based on horizontal line count. Another advantage is detection of a non-standard mode of operation used for non-standard video input (VCR, video games, etc.) where vertical sync output is generated when detected at the input. Another advantage is a start-up mode of operation used for power-up, reset, and no video input. Another advantage is the use of even and odd windows to enable sync detection, and filter out undesirable noise. Another advantage is a microprocessor controlled means of vertical sync detection and output generation; control parameters may be easily adjusted for optimization in various applications. Another advantage is the use of half-line pixel accumulators to detect vertical sync in the input signal and filter out undesirable noise. Another advantage is the threshold for sync detection adapts to varying input signal conditions. Another advantage is three modes of operation for ease and flexibility for different types of video inputs. The algorithm automatically switches between the different modes based on input signal characteristics such as lines per frame, and no sync, standard sync, or non-standard sync detection. Another advantage is that the standard mode of operation is used for standard video where vertical sync output is generated based on the horizontal line count. A flywheel effect is implemented which enables continuous output even when momentary loss of sync at the input occurs for several frames.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Innovative Firmware

Figure 1:
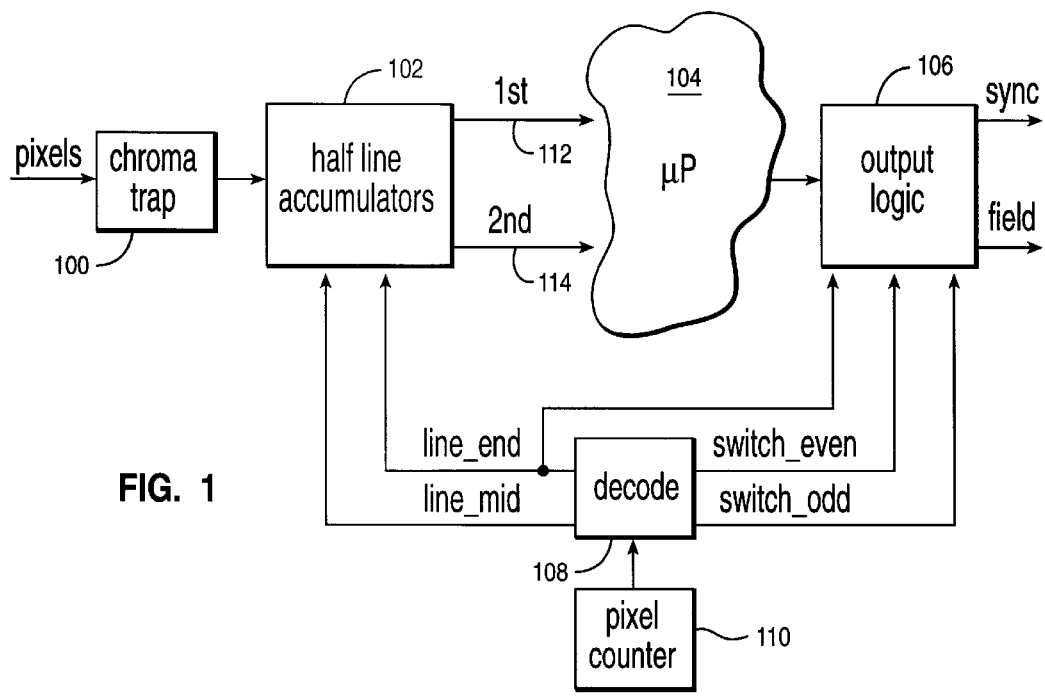
FIG. 1 shows a block diagram of the vertical sync detection and output firmware.

A block diagram of the vertical sync detection and output firmware is shown in FIG. 1, and has been implemented in the TVP50x0 family of video decoder chips. Pixels from an analog-to-digital ("A2D") converter are fed to a chroma trap 100 which filters out the color subcarrier frequency. The chroma filter output is then fed to an accumulator 102 which sums the first-half and second-half line counts. A microprocessor 104 reads the two half-line sums from the accumulator 102 and applies a program to detect the vertical sync. The microprocessor then writes two bits to an output logic circuit 106 for vertical sync, and odd or even field identification. The pixel counter 110 provides a signal to a decoder 108 where two decode signals control the time at which the output logic 106 registers are loaded.

Accumulator Circuit

Figure 2:
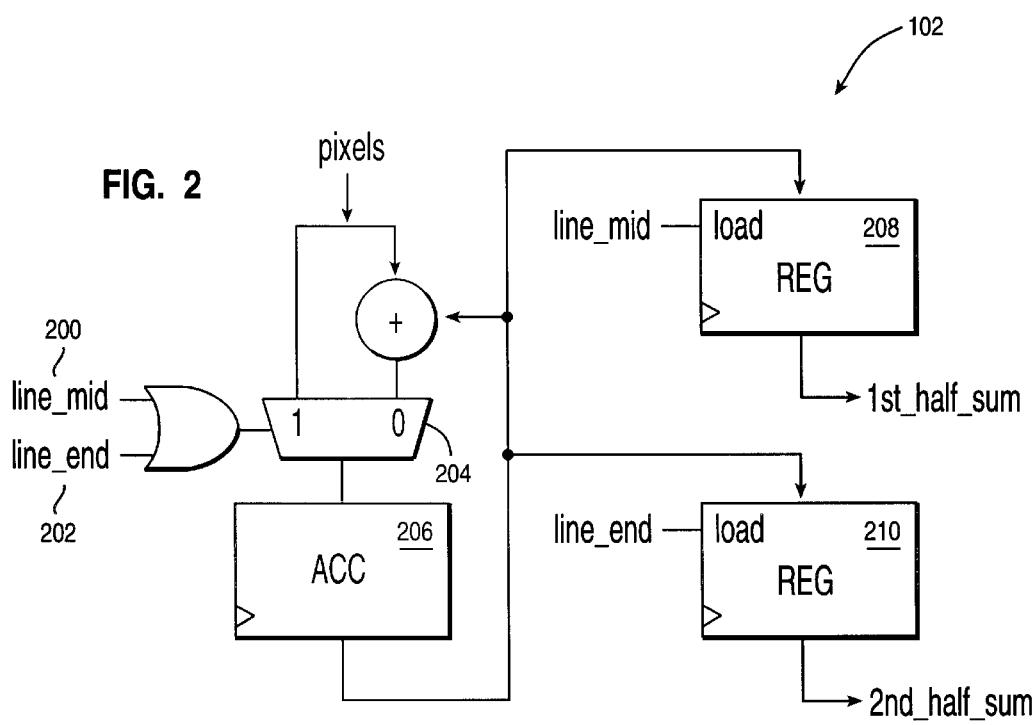
FIG. 2 shows an accumulator block which receives the chroma filter output.

The output of the chroma filter 100 is then fed to an accumulator 102, as shown in detail in FIG. 2. The accumulator 102 sums the two pixel counts—one for the first half of a line, and one for the second half of the line. The line mid-point timing signal 200 and the line-end timing signal 202, both from the pixel counter decode circuit 108, are logically-ORed to a logical switch 204 to initialize the accumulation register 206, and load the output buffer registers (208 and 210). The microprocessor 104 reads the half-line pixel sums (1st_half_sum 112, and 2nd_half_sum 114) on a line-by-line basis, and applies a method for detecting the vertical sync pulse. A vertical sync output is generated based on the mode of operation and a horizontal line counter.

Vertical Sync Output Logic

Figure 3:
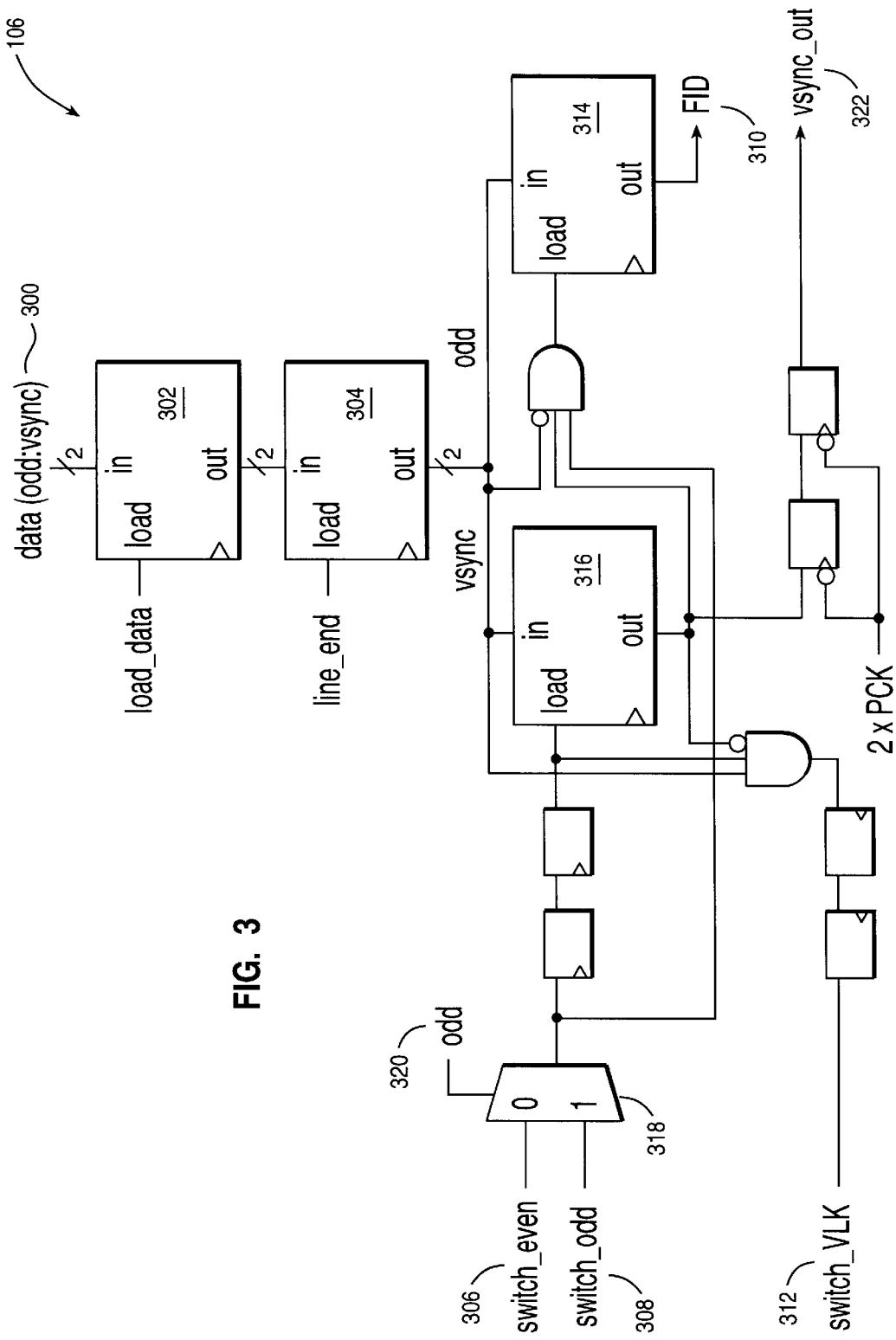
FIG. 3 shows the vertical sync output logic.

The microprocessor 104 writes two bits to the output logic circuit 106, shown in detail in FIG. 3. The two bits are sent to an input 300 of a buffer register 302 in the output logic 106—one bit for vertical sync, and the other bit for odd or even field identification. At the end of a line, the data is transferred to a second buffer register 304 from which the outputs are generated for the next line. Two decode signals (306 and 308) from the pixel counter decode circuit 108 control the time at which the output registers (314 and 316) are loaded. The vertical sync register 316 switches based on the status of a switch 318 controlled by a signal 320. Switching occurs at a half-line point for an odd field, or a line point for even field. To maintain compatibility with the decoder, in this case a 7110 decoder manufactured by Philips Semiconductors, the field identification ("FID") output 310 switches two pixel clocks before the vertical sync output 322. The switch_VLK output signal 312 switches two clocks after the rising edge of a vertical sync and enables the vertical lock output 312 to switch.

Modes of Operation

Figure 4:
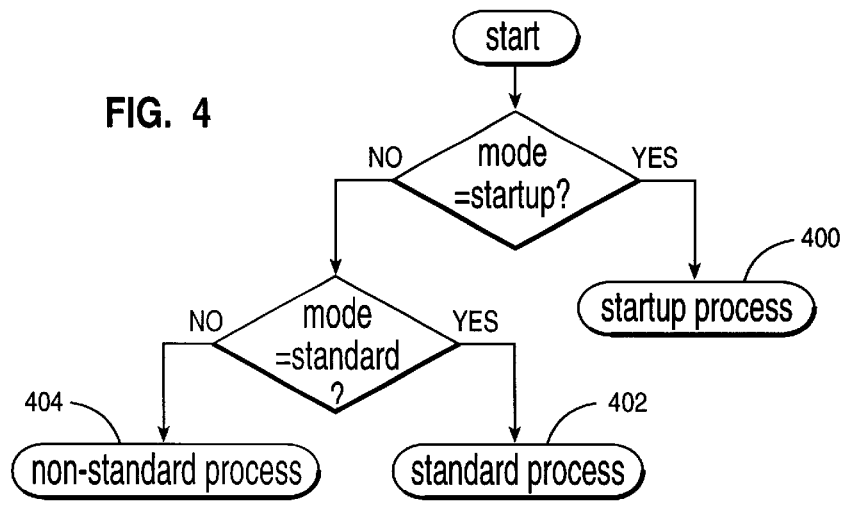
FIG. 4 shows the three modes of operation for the vertical sync algorithm.

FIG. 4 illustrates the three modes of operation for the vertical sync algorithm. The startup mode (Block 400) is entered upon power-up, reset, or when no video input is present. Standard mode (Block 402) is utilized when a standard video input is present, and non-standard mode (Block 404) is utilized when a video source outputs a non-standard number of horizontal lines per frame (VCR pause, rewind, fast forward, and for video games), The detection of a vertical sync at the input is based on the comparison of the 1st and 2nd half-line sums against a threshold which adapts to changing input conditions.

Vertical Sync Threshold Computation

Figure 5:
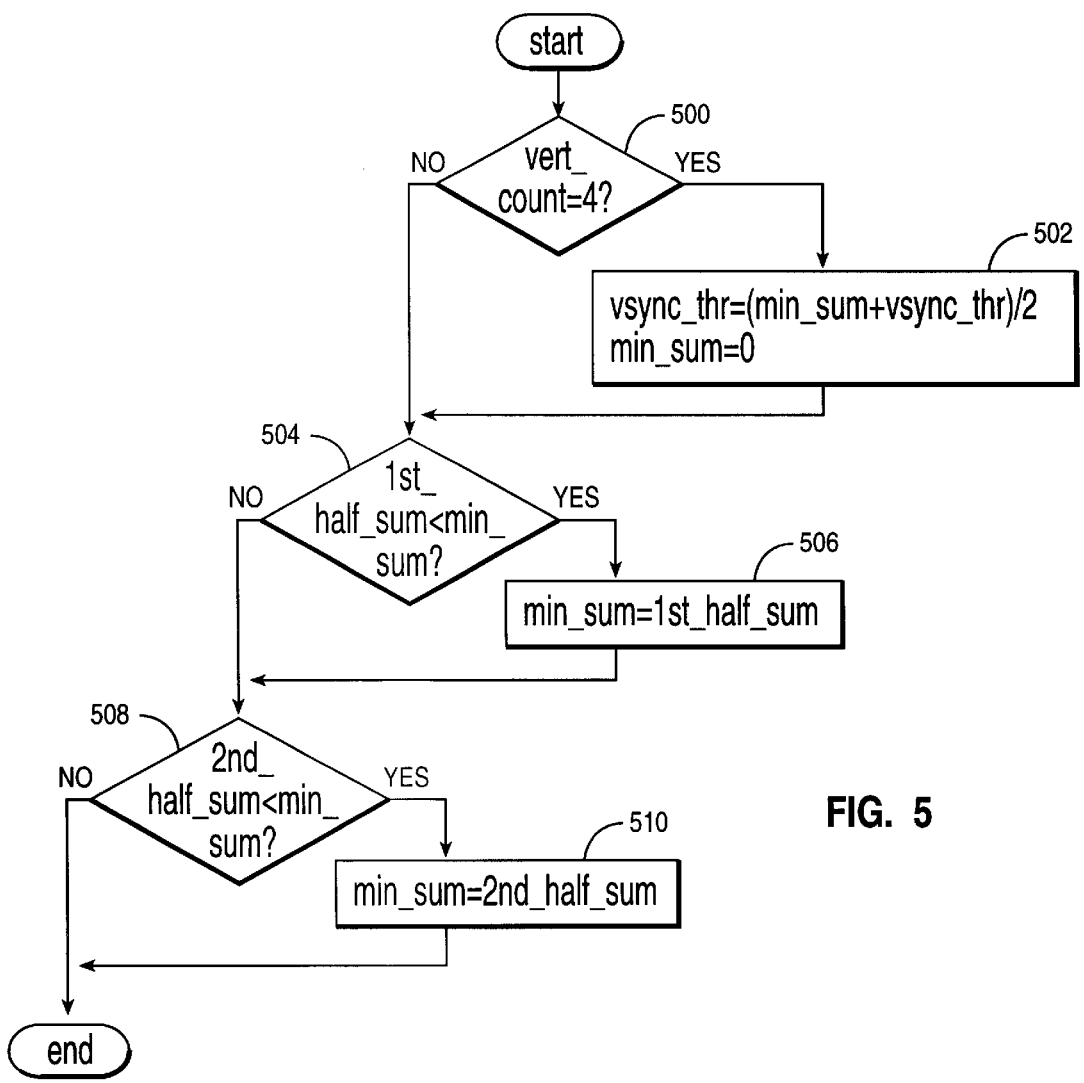
FIG. 5 shows a flowchart of the computation process for the vertical sync threshold.

FIG. 5 illustrates the computation for the vertical sync threshold (vsync_thr), which is done once per frame (a vertical count of 4). The minimum half-line sum for a frame is determined and averaged with the previous frame threshold to determine a new threshold. If the vertical count has not reached a value of four (Block 500), a comparison is first made of the 1st half-line sum with a minimum sum (min_sum) (Block 504). Similarly, the 2nd half-line sum is compared with the minimum sum (Block 508). If either of the half-line sums remain below the minimum sum (min_sum), min sum is incremented by the respective half-line sum value (Blocks 506 and 510). When either half-line sum is no longer less than the min_sum, the incrementation process stops. If the vertical count ultimately equals 4 (Block 500), the vertical sync threshold value (vsync_thr) is increased by the minimum sum value, and averaged. The minimum sum value is then initialized in preparation for determining the next threshold value for vsync_thr (Block 502).

Figure 6:
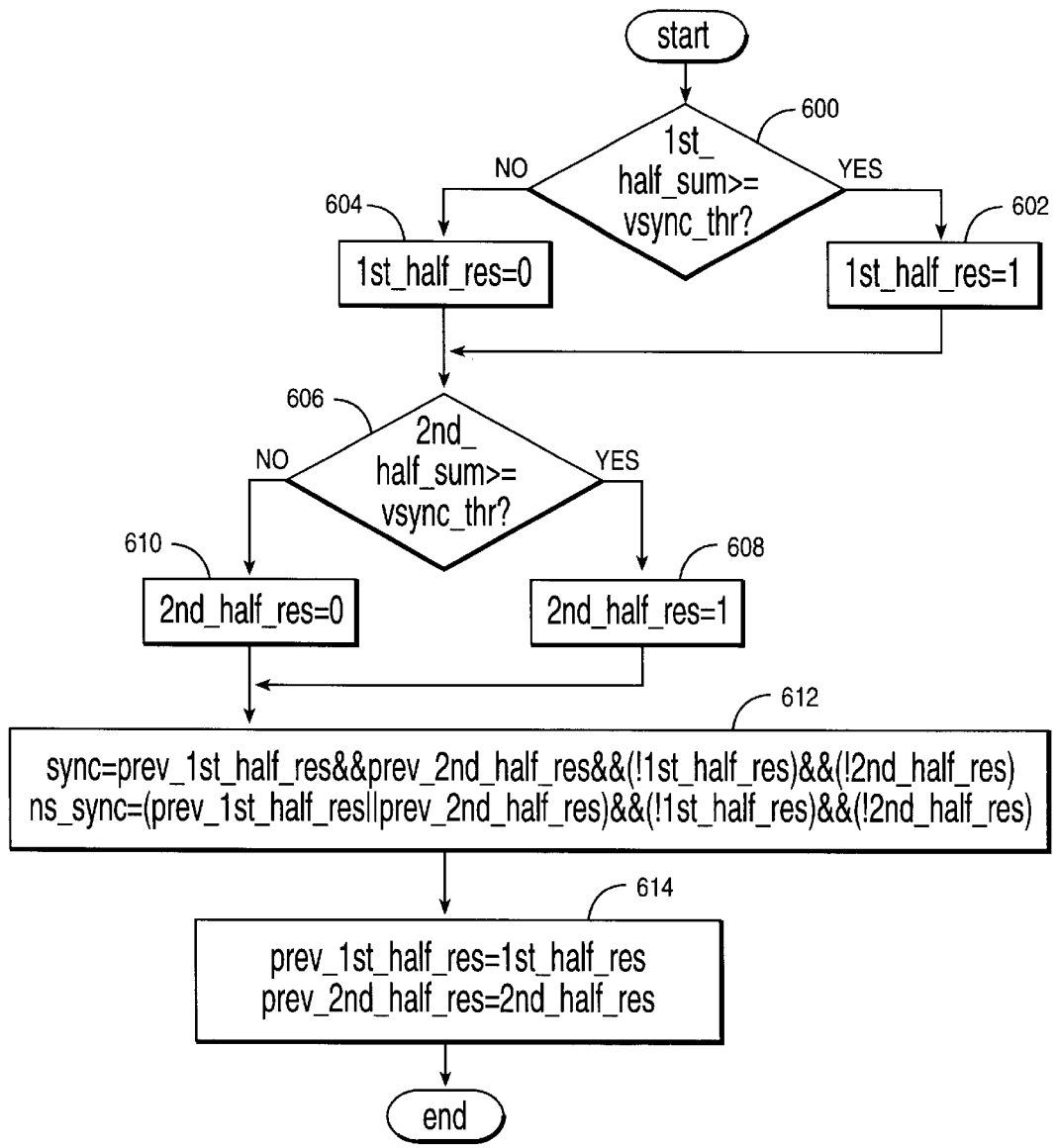
FIG. 6 shows a flowchart of the process for comparing the 1st and 2nd half-line sums with the threshold to determine a logical result.

The 1st and 2nd half-line sums are compared against the vertical sync threshold value (Blocks 600 and 606) to determine a logical result: 1st_half_res and 2nd_half_res (Blocks 602, 604, 608, and 610). This is illustrated in FIG. 6. These boolean results are combined with a previous frame's results to determine the boolean variables sync and ns_sync (non-standard sync) (Blocks 612 and 614). A don't-care state is indicated by x in the table of FIG. 6. The variable "sync" represents the detection of an odd field while "ns_sync" can represent the detection of an even or odd field sync, or some other non-standard sync. These variables serve as inputs to the vertical sync algorithm.

Start-up Mode

Figure 7:
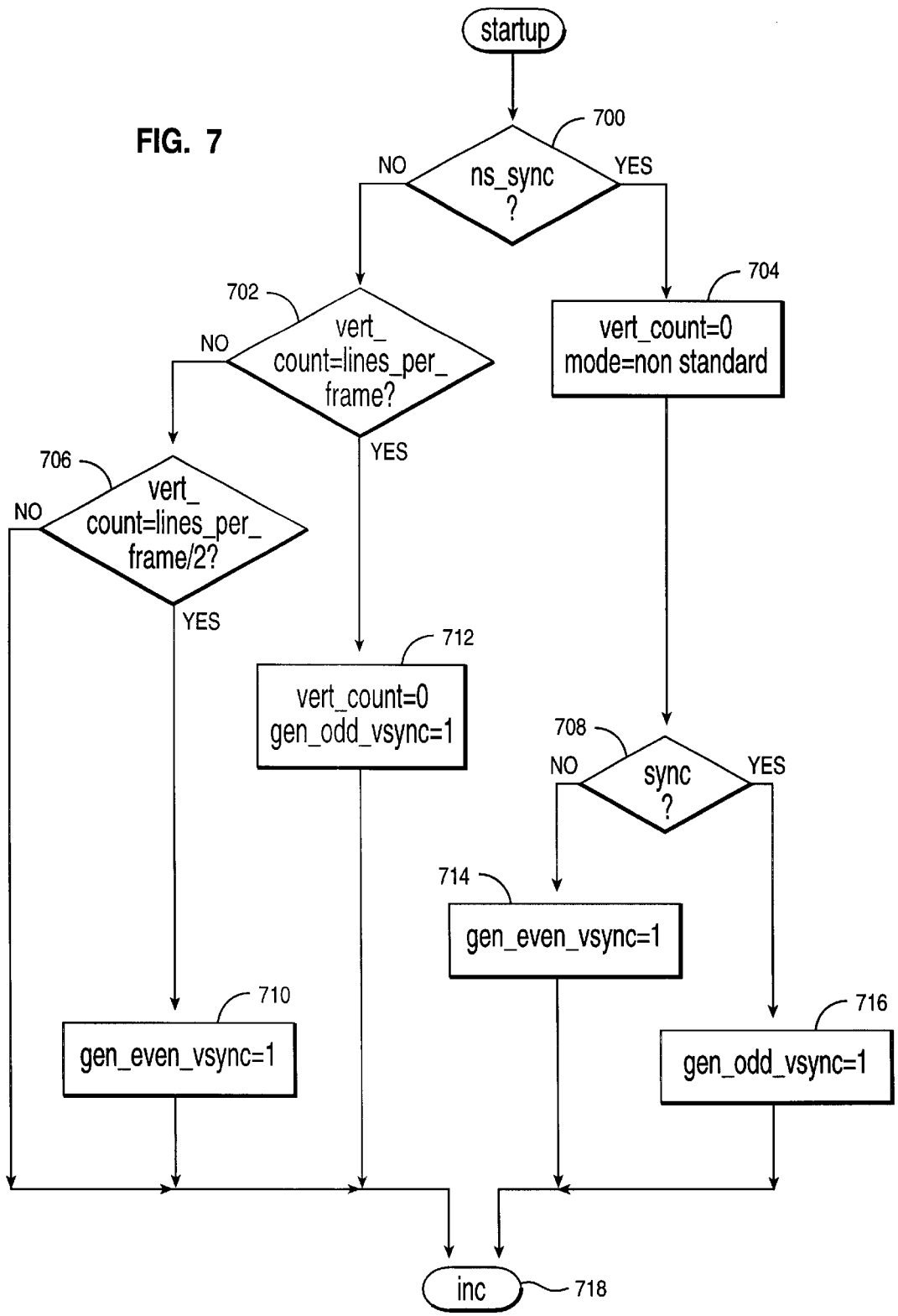
FIG. 7 shows the start-up mode of operation that occurs after power-up, reset, and the presence of no video signal input.

FIG. 7 illustrates the start-up mode of operation that occurs after power-up, reset, and the presence of no video input. The horizontal line counter is labeled vert_count, and counts from 1 to a terminal count (line_per_frame). If no sync is detected (ns_sync is false) (Block 700), then vert_count is compared with lines_per_frame (Block 702) or half lines_per_frame (Block 706). If a match occurs, then a flag is set to generate an even or odd sync (Blocks 710 or 712), otherwise vert_count is simply incremented (Block 718). If the vert_count reaches its terminal count, then vert_count is reset and subsequently incremented to one. If ns_sync is true (Block 700), then vert_count is reset and a switch will be made to the non-standard mode Block 704). If sync is true (Block 708), then the flag is set to generate an odd field sync (Block 716). If sync is false, then the flag is set to generate an even field sync (Block 714). Again, flow passes to increment vert_count (Block 718).

Opening Odd and Even Windows

Figure 8:
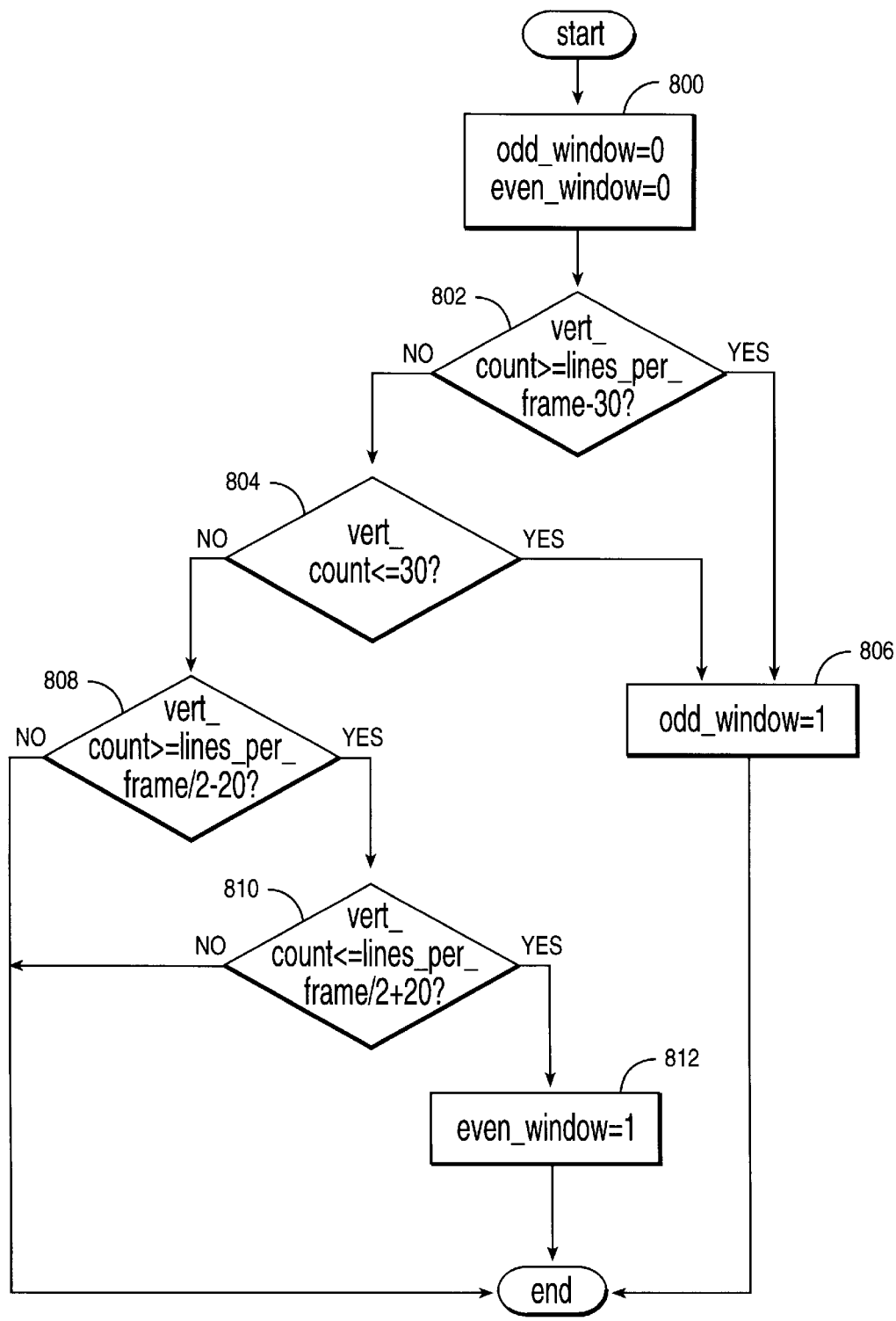
FIG. 8 shows that the odd and even windows are opened during which sync detection can occur.

A flowchart addressing odd and even windows is illustrated in FIG. 8. An odd and even window are opened during which sync detection can occur, standard sync is detected, and the vertical count is recorded and used to generate the even field, sync output. The odd and even window initial conditions are set (Block 800). The odd window is 61 lines wide, and is centered about the terminal count (line_per_frame). If the horizontal line count (vert_count) is greater than or equal to the terminal count less 30 (Block 802), then the odd window value is set to one (Block 806). If not, then a second determination is made to check if the horizontal line count exceeds the value of 30 (Block 804). If not, the odd window value is set to one (Block 806). Otherwise, program flow moves to the even window code. The even window is 41 lines wide, and is centered about half of the terminal count (lines_per_frame/2). If the horizontal count is greater than or equal to half of the terminal count less 20, than the even window value remains at zero (Block 808). Otherwise, a determination is made whether the horizontal line count is less than or equal to half of the terminal count plus 20 (Block 810). If so, the even window value is set to one (Block 812). Otherwise, the even window value remains at zero.

Standard Mode

Figure 9:
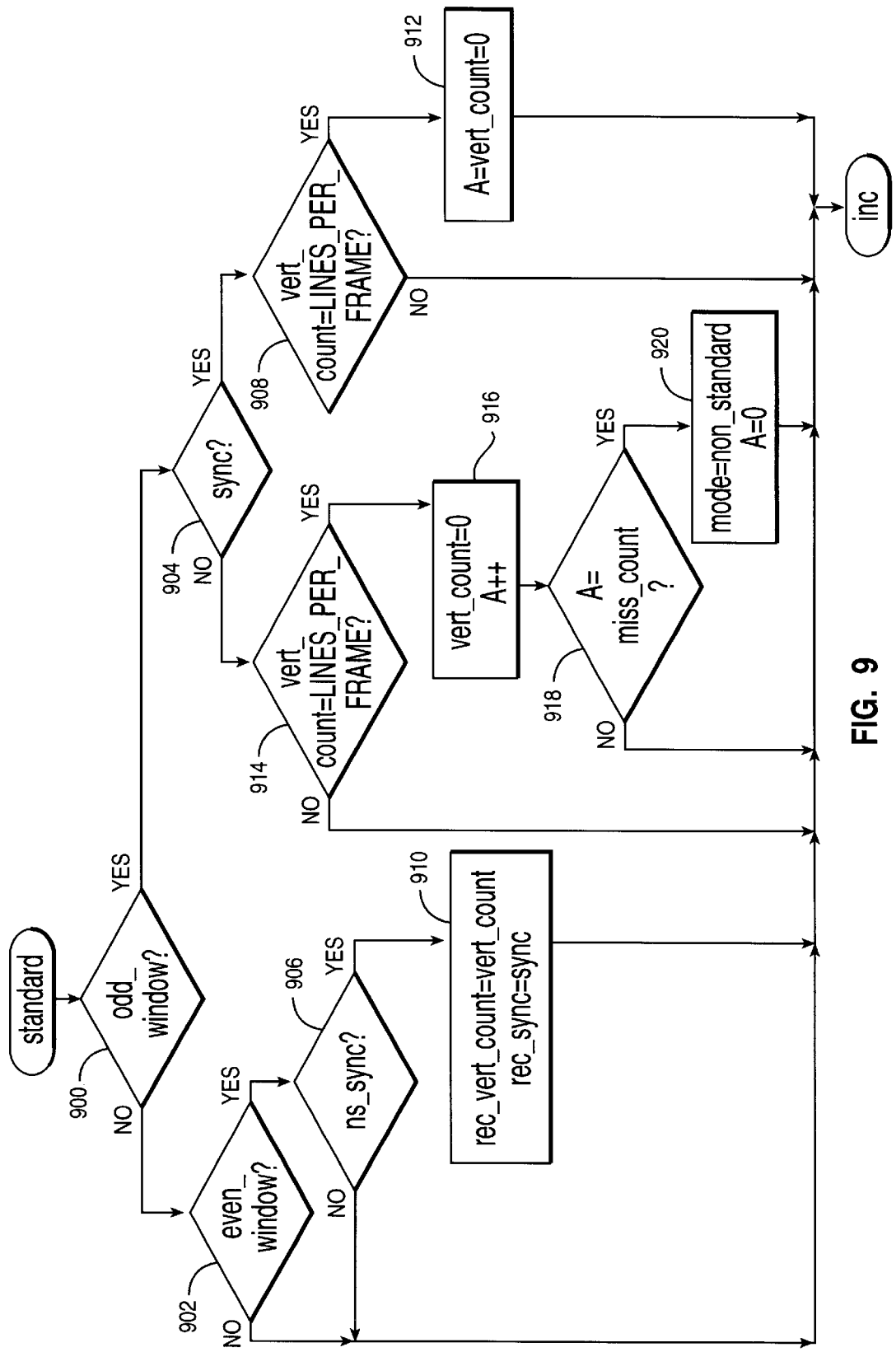
FIG. 9 shows the processing for the standard mode of operation where a video signal is present.

FIG. 9 illustrates the processing for the standard mode of operation where a standard video source is present. During the odd window (Block 900), if the vertical count reaches the terminal count (Block 914) and no sync is detected (Block 904), then vert_count is reset and a miss count "A" is incremented (Block 916). If the miss count reaches a maximum limit (Block 918), then a switch is made to non-standard mode (Block 920). During the even window (Block 902), if a non-standard sync is detected (Block 906), then vert_count and sync are recorded for use in generating the output (Block 910). The reset of the counter vert_count (Block 912) occurs when it is equal to the terminal count (Block 908).

Standard Mode Sync Output

Figures 10, 11:
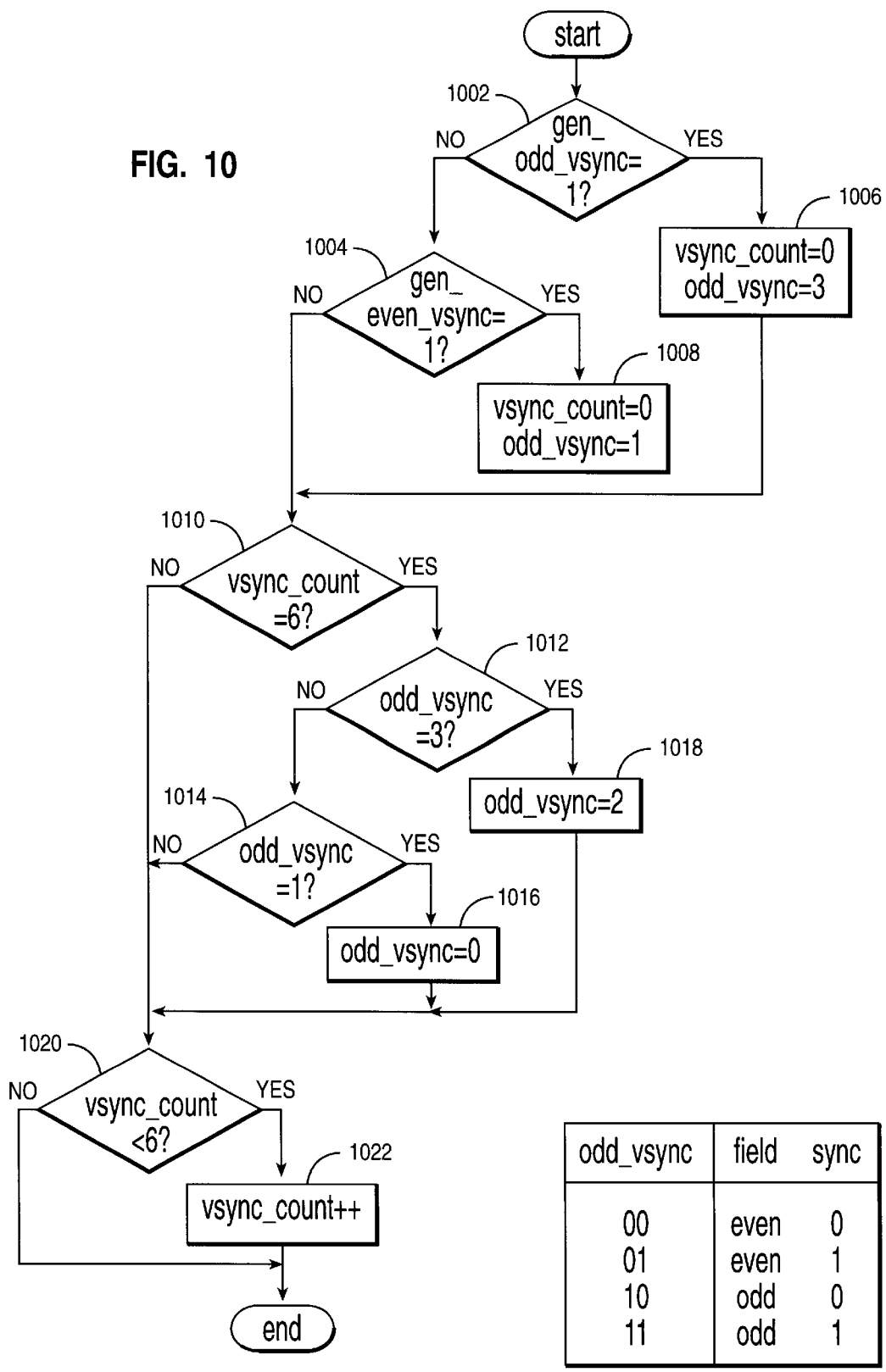
FIG. 10 shows the logic for generating the sync output during the standard mode.
FIG. 11 shows two bits of the variable odd_vsync.

FIG. 10 illustrates the logic for generating the sync output during standard mode. The variables gen_odd_vsync and gen_even_vsync trigger the generation of the odd and even field sync pulse outputs. If either gen_odd_sync or gen_even_sync are detected (Blocks 1002 and 1004), then the vertical sync count is reset, but the odd vertical sync count is set to three (binary $11=11_2$) if an odd field output is generated (Block 1006), whereas the odd vertical sync is set to one ($01_2$) if an even field output is generated (Block 1008). If neither an odd field nor an even field vertical sync is detected, then the variable vsync_count is used to determine the vertical sync output width by incrementing itself each time the microprocessor executes its program. The output width is set to six horizontal lines (Block 1010). If the vertical sync count has not reached 6 (Blocks 1010 and 1020), then the count is incremented for the next program run (Block 1022).

The variable odd_vsync is written by the microprocessor to the vertical sync output logic and consists of two bits which are defined in FIG. 11. If the vertical sync count equals six horizontal lines (Block 1010), the odd vertical sync is checked against the values of 3 and 1 (based on whether an odd or even field was generated (Blocks 1006 and 1008)). If the odd_vsync equals one ($01_2$ for an even field) (Block 1014), then the value of odd_vsync is changed to zero (Block 1016) (to change the sync pulse level from a high to a low state) and the program ends. If the odd_vsync equals three ($11_2$ for an odd field) (Block 1012), then the value of odd_vsync is changed to 2 ($10_2$ to change the pulse state from high to low) (Block 1018) and the program ends.

Non-Standard Mode

Figure 12:
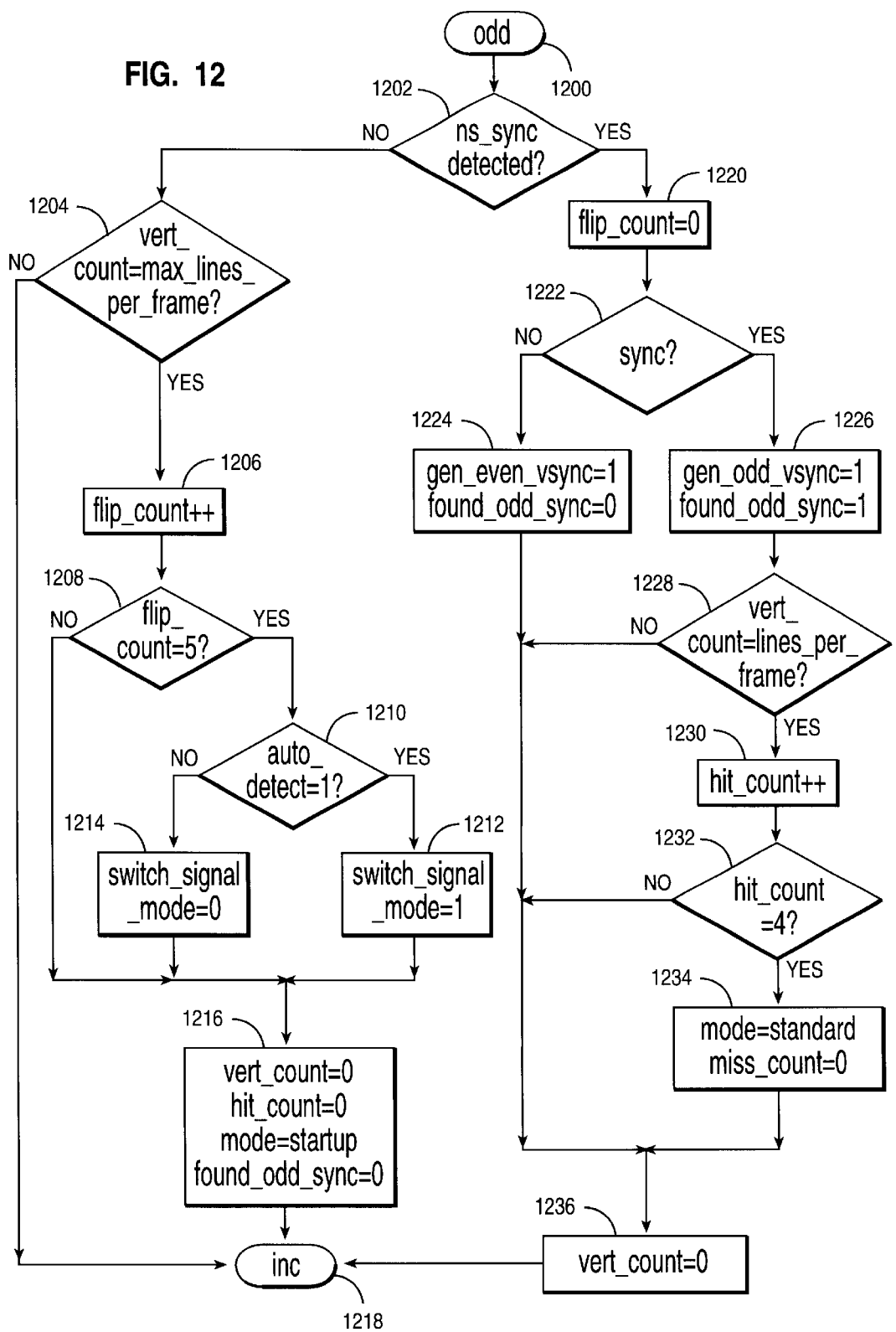
FIG. 12 shows the odd window processing during non-standard mode.

Odd and even windows are opened in which both standard and non-standard syncs may be detected. During the non-standard mode, the sync output is generated when a sync is detected at the input (and not based on a line counter as in standard mode), and vert_count is reset to zero. FIG. 12 illustrates the processing for an odd window. After an odd window has been opened (Block 1200), the program checks for a non-standard sync bit pattern (1000 or 0100) (Block 1202). If a non-standard sync is not detected during the odd window (Block 1202), the vertical count is compared against a maximum value (Block 1204) (e.g. 525 for NTSC); if equal, then flip_count is incremented (Block 1206). If flip_count reaches a limit (Block 1208) and auto detection of the NTSC/PAL standard is enabled (Block 1210), then switch_signal_mode is set (Block 1212). This results in a switch to a different standard (e.g. PAL), and complete reinitialization of the software. Otherwise, if no auto detect (Block 1210), switch_signal_mode is reset (same standard maintained) (Block 1214), vert_count is reset, and a switch to startup mode is made (Block 1216).

If a non-standard sync is detected (Block 1202), then flip_count is set to zero (Block 1220). A determination is made as to whether the sync is an odd field sync (1100) or even field sync (1000) (Block 1222). The odd or even field sync output flag is enabled (Blocks 1224 and 1226) depending on the type of sync detected. The vertical count is always reset to zero (Blocks 1216 and 1236). If the sync is standard (the vertical count is equal to the terminal count (Block 1228)), then a hit count A is incremented (Block 1230). If the hit count A is equal to the hit count (Block 1232), then a switch is made to standard mode (Block 1234).

Figure 13:
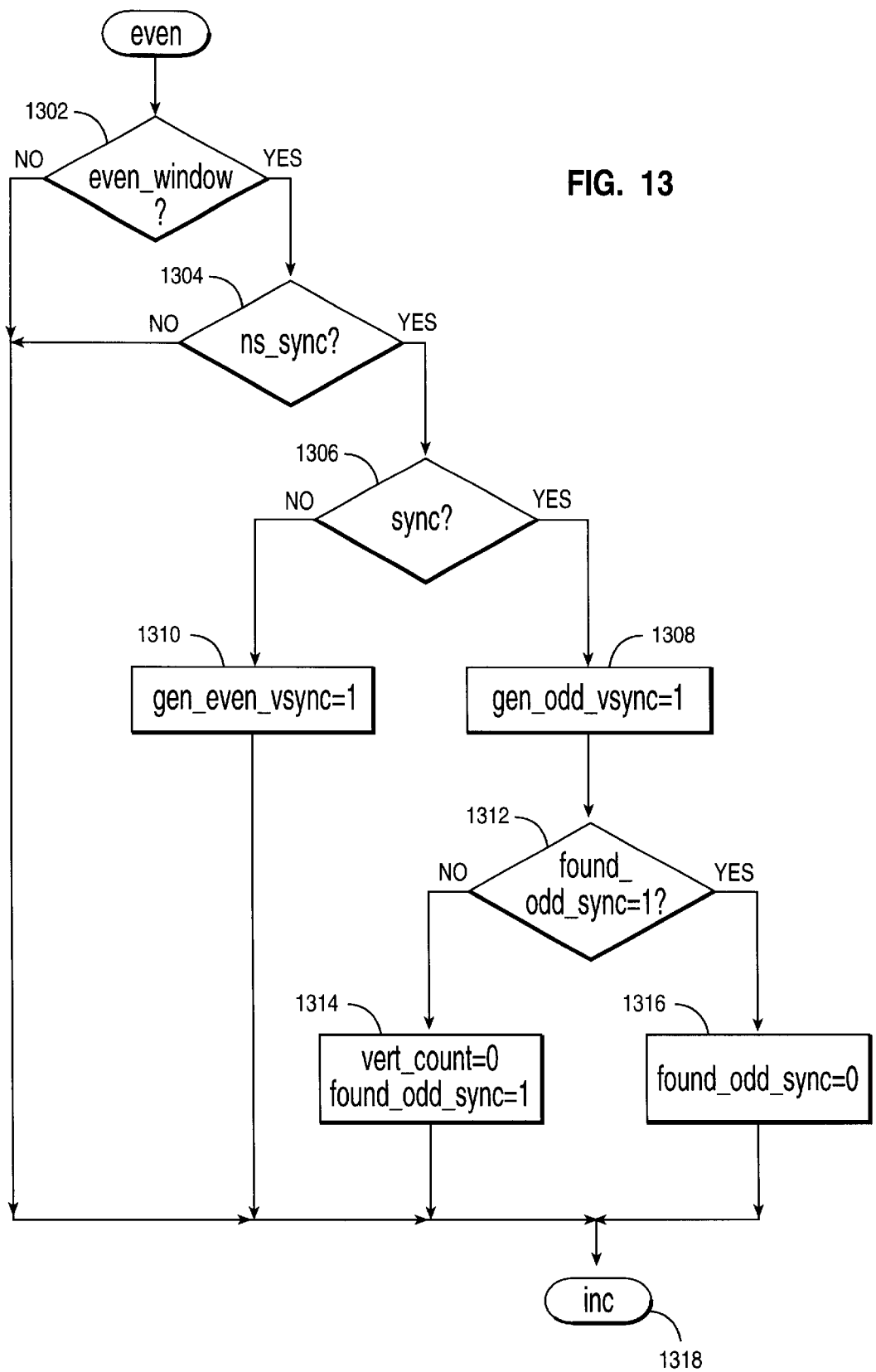
FIG. 13 shows the even window processing during non-standard mode.

FIG. 13 illustrates the processing for the even window. If an even window is detected (Block 1302), then a determination is made as to whether the sync is non-standard (Block 1304). If a non-standard sync is detected, a determination is made as to whether it is actually a standard sync (Block 1306). If a standard sync is detected, then the corresponding output flag is enabled (Block 1308). If a standard sync is detected, then the found_odd_sync flag is checked to see if it has been found within the odd window (Block 1312). If false, then the vertical count is reset to zero to align the odd field sync to occur within the odd window (Block 1314). If true, the found_odd_sync value is reset (Block 1316). If a standard sync is not detected, then the even output flag is set (Block 1310). In all cases, the program than increments to the next line (Block 1318).

Vertical Sync of NTSC and PAL Standards

Figure 14A:
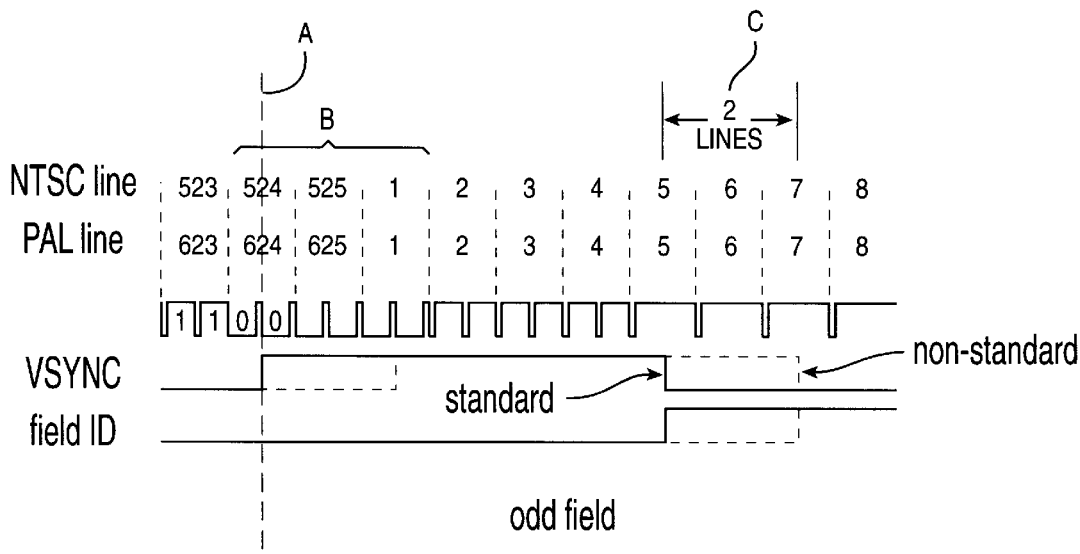
FIGS. 14A and 14B show the vertical sync interval for the odd and even fields, respectively, of the composite video input and the corresponding vertical sync and field identification outputs for both NTSC and PAL standards.
Figure 14B:
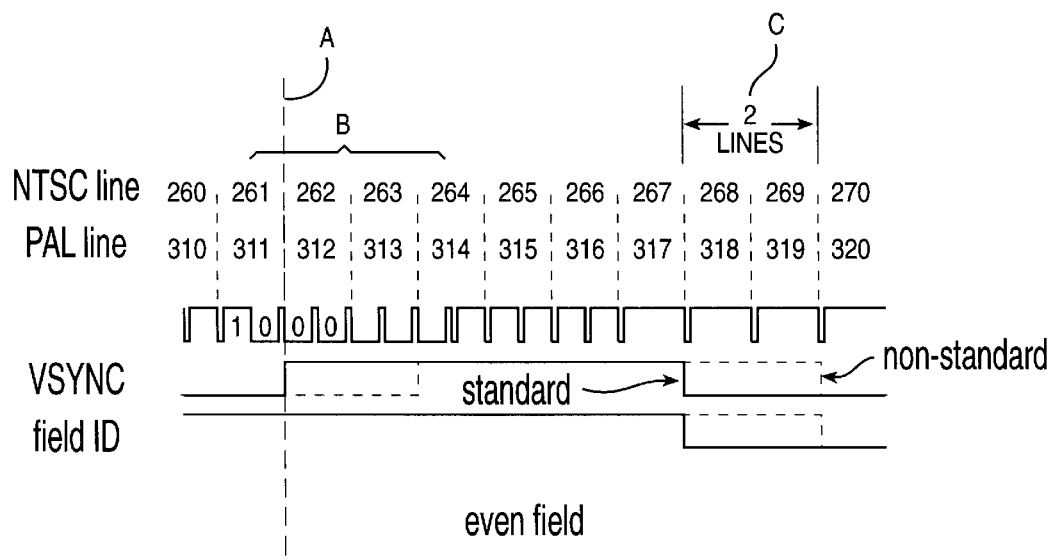

FIGS. 14A and 14B show the vertical sync interval for the odd and even fields, respectively, of a composite video input and the corresponding vertical sync and field identification outputs ("field ID") for both NTSC and PAL standards. (The following discussion pertains to the odd and even fields of an NTSC system, but the application is similar for a PAL system.) The series of pulses in Section B comprise three lines of sync ("serration") pulses (lines 524, 525, and 1, for an odd field; lines 261.5–263.5 for the even field). Point A indicates the point at which vertical sync is generated for standard mode. Note that in non-standard mode, the sync must be detected before the output is generated. Therefore the sync output is shifted two horizontal lines (Section C) to the right to accommodate the time for detection (as compared to the standard mode where the output is based on the horizontal line count). Note that the vertical sync pulse width is set to a maximum of 6 horizontal lines, as mentioned in the discussion of FIG. 10. A low state for the field ID indicates and even field, and a high state indicates an odd field. The field ID pulse must be extended to change at the same time as the trailing edge of the sync pulse.

According to a disclosed class of innovative embodiments, there is provided:, a video detection circuit, comprising: an input for receiving a digital video signal; and a control circuit for automatically detecting whether a mode of said digital video signal is standard, non-standard, or not present, and automatically adapting to said mode to provide a synchronization pulse at an output of said video detection circuit based upon said mode.

According to another disclosed class of innovative embodiments, there is provided: a video detection circuit, comprising: an input for receiving a digital video signal; and a control circuit for outputting a synchronization pulse based upon automatic detection of, and adaptation to, a plurality of modes of said digital video signal, said plurality of modes comprising a start-up mode, wherein said synchronization pulse is output in free-running mode when no signal is present at said input; a standard mode, wherein said synchronization pulse is output based upon a sum obtained from a counter circuit; and a non-standard mode, wherein said synchronization pulse is output upon detection of a first pulse of said digital video signal, and said standard mode cannot be used.

According to another disclosed class of innovative embodiments, there is provided: a method for automatically outputting a vertical sync based upon a video decoder input signal, comprising the steps of: (a.) automatically detecting a start-up, standard, or non-standard mode of a digital video signal at an input; and (b.) outputting a vertical synchronization pulse in dependence upon said mode of said video input signal.

According to another disclosed class of innovative embodiments, there is provided: a method for automatically outputting a vertical sync based upon a video decoder input signal, comprising the steps of: (a.) receiving a digital video signal at an input; and (b.) outputting a synchronization pulse based upon automatic detection of, and adaption to, a plurality of modes of said digital video signal, said plurality of modes comprising a start-up mode, wherein said synchronization pulse is output in free-running mode when no signal is present at said input; a standard mode, wherein said synchronization pulse is output based upon a sum obtained from a counter circuit; and a non-standard mode, wherein said synchronization pulse is output upon detection of a first pulse of said digital video signal, and said standard mode cannot be used.

Modifications and Variations

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

What is claimed is:

1. A video detection circuit, comprising:
   an input for receiving a digital video signal;
   a pixel accumulator which sums first-half and second-half horizontal line counts;
   a control circuit coupled to the pixel accumulator for automatically detecting whether a mode of said digital video signal is standard, non-standard, or not present, and automatically adapting to said mode to provide a synchronization pulse at an output of said video detection circuit based upon said mode; and, wherein the control circuit comprises
   a microprocessor which reads first-half and second-half horizontal line count sums from the pixel accumulator on a line-by-line basis and applies a method for detecting a vertical sync pulse.

2. The circuit of claim 1, wherein when no said digital video signal is present, said video detection circuit outputs the vertical sync pulse in free-running mode.

3. The circuit of claim 1, wherein said standard mode comprises an NTSC and PAL standard.

4. The circuit of claim 1, wherein said non-standard mode comprises outputting the vertical sync pulse when a non-standard number of horizontal lines per frame are detected at said input.

5. The circuit of claim 1, wherein said standard mode comprises receiving said digital video signal at said input, and outputting the vertical sync pulse based upon a horizontal line count of said digital video signal.

6. The circuit of claim 1, wherein in said standard mode, if a vertical count reaches a preset value and no input vertical sync is detected, then said non-standard mode is entered.

7. The circuit of claim 1, wherein odd and even windows are opened when in both said standard and non-standard modes.

8. A video detection circuit, comprising:
   an input for receiving a digital video signal;
   a pixel accumulator which sums first-half and second-half horizontal line counts; and
   a control circuit coupled to the pixel accumulator for outputting a synchronization pulse based upon automatic detection of, and adaptation to, a plurality of modes of said digital video signal, said plurality of modes comprising
   a start-up mode, wherein said synchronization pulse is output in free-running mode when no signal is present at said input;
   a standard mode, wherein said synchronization pulse is output based upon a sum obtained from a counter circuit; and
   a non-standard mode, wherein said synchronization pulse is output upon detection of a first pulse of said digital video signal, and said standard mode cannot be used.

9. The circuit of claim 8, wherein when no said digital video signal is present, said video detection circuit outputs a sync pulse in free-running mode.

10. The circuit of claim 8, wherein said standard mode comprises an NTSC and PAL standard.

11. The circuit of claim 8, wherein said non-standard mode comprises outputting a vertical sync pulse when a non-standard number of horizontal lines per frame are detected at said input.

12. The circuit of claim 8, wherein said standard mode comprises receiving said digital video signal at said input, and outputting a vertical sync pulse based upon a horizontal line count of said digital video signal.

13. The circuit of claim 8, wherein said video detection circuit is digitally-controlled by a microprocessor running a program which automatically switches said mode based on characteristics of said digital video signal.

14. The circuit of claim 8, wherein said video detection circuit is digitally-controlled by a microprocessor which reads half-line pixel sums on a line-by-line basis and applies a method for detecting a vertical sync pulse.

15. The circuit of claim 8, wherein in said standard mode, if a vertical count reaches a preset value and no input vertical sync is detected, then said non-standard mode is entered.

16. The circuit of claim 8, wherein odd and even windows are opened when in both said standard and non-standard modes.

17. A method for automatically outputting a vertical sync based upon a video decoder input signal, comprising the steps of:
   (a.) automatically detecting a start-up, standard, or non-standard mode of a digital video signal at an input;
   (b.) outputting a vertical synchronization pulse in dependence upon said mode of said video input signal;
   (c.) opening odd and even windows when in both said standard and non-standard modes; and
   (d.) entering said non-standard mode when in said standard mode if a vertical count reaches a preset value and no input vertical sync is detected.

18. The method of claim 17, wherein when no said digital video signal is present, said video detection circuit outputs a sync pulse in free-running mode.

19. The method of claim 17, wherein said standard mode comprises an NTSC and PAL standard.

20. The method of claim 17, wherein said non-standard mode comprises outputting a vertical sync pulse when a non-standard number of horizontal lines per frame are detected at said input.

21. The method of claim 17, wherein said standard mode comprises receiving said digital video signal at said input, and outputting a vertical sync pulse based upon a horizontal line count of said digital video signal.

22. The method of claim 17, wherein said video detection circuit employs a pixel accumulator which sums first-half and second-half horizontal line counts.

23. The method of claim 17, wherein said video detection circuit is digitally-controlled by a microprocessor running a program which automatically switches said mode based on characteristics of said digital video signal.

24. The method of claim 17, wherein said video detection circuit is digitally-controlled by a microprocessor which reads half-line pixel sums on a line-by-line basis and applies a method for detecting a vertical sync pulse.

25. A method for automatically outputting a vertical sync based upon a video decoder input signal, comprising the steps of:
   (a.) receiving a digital video signal at an input;

(b.) summing first-half and second-half horizontal line counts from said digital video signal to form two half-line sums; and (c.) deriving a synchronization pulse from said two half-line sums based upon automatic detection of, and adaption to, a plurality of modes of said digital video signal, said plurality of modes comprising a start-up mode, wherein said synchronization pulse is output in free-running mode when no signal is present at said input;

a standard mode, wherein said synchronization pulse is output based upon a sum obtained from a counter circuit; and a non-standard mode, wherein said synchronization pulse is output upon detection of a first pulse of said digital video signal, and said standard mode cannot be used.

26. The method of claim 25, wherein when no input signal is received, said video detection circuit outputs a sync pulse in free-running mode.

27. The method of claim 25, wherein said standard mode comprises an NTSC and PAL standard.

28. The method of claim 25, wherein said non-standard mode comprises outputting a vertical sync pulse when a non-standard number of horizontal lines per frame are detected at said input.

29. The method of claim 25, wherein said standard mode comprises receiving said digital video signal at said input, and outputting a vertical sync pulse based upon a horizontal line count of said digital video signal.

30. The method of claim 25, wherein said video detection circuit is digitally-controlled by a microprocessor running a program which automatically switches said mode based on characteristics of said digital video signal.

31. The method of claim 25, wherein said video detection circuit is digitally-controlled by a microprocessor which reads half-line pixel sums on a line-by-line basis and applies a method for detecting a vertical sync pulse.

32. The method of claim 25, wherein in said standard mode, if a vertical count reaches a preset value and no input vertical sync is detected, then said non-standard mode is entered.

33. The method of claim 25, wherein odd and even windows are opened when in both said standard and non-standard modes.

* * * * *